(12) United States Patent
Kanke

(10) Patent No.: US 11,821,812 B2
(45) Date of Patent: Nov. 21, 2023

(54) TEST SYSTEM HAVING A DYNAMOMETER AND A CORRESPONDING DYNAMOMETER CONTROL DEVICE

(71) Applicant: MEIDENSHA CORPORATION, Tokyo (JP)

(72) Inventor: Masayasu Kanke, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/028,443

(22) PCT Filed: Sep. 3, 2021

(86) PCT No.: PCT/JP2021/032410
§ 371 (c)(1),
(2) Date: Mar. 24, 2023

(87) PCT Pub. No.: WO2022/070759
PCT Pub. Date: Apr. 7, 2022

(65) Prior Publication Data
US 2023/0273094 A1    Aug. 31, 2023

(30) Foreign Application Priority Data
Sep. 29, 2020   (JP) ................................. 2020-163268

(51) Int. Cl.
*G01M 15/02*   (2006.01)
*G01L 3/04*   (2006.01)
(52) U.S. Cl.
CPC ............... *G01M 15/02* (2013.01); *G01L 3/04* (2013.01)

(58) Field of Classification Search
CPC .................................. G01L 3/04; G01M 15/02
See application file for complete search history.

(56) References Cited

U.S. PATENT DOCUMENTS

2003/0083793 A1\* 5/2003 Akiyama ............ G01M 15/044
73/862.08
2014/0019081 A1   1/2014 Suzuki et al.
(Continued)

FOREIGN PATENT DOCUMENTS

JP      H8136408 A     5/1996
JP      200039381 A    2/2000
(Continued)

*Primary Examiner* — Eric S. McCall
(74) *Attorney, Agent, or Firm* — Muncy, Geissler, Olds & Lowe, P.C.

(57) ABSTRACT

This test system comprises: a dynamometer connected to a test piece W; an inverter for supplying electric power to the dynamometer; an encoder for generating a speed detection signal N corresponding to a rotational speed of the dynamometer; and a dynamometer control device 6 for generating a torque current command signal DYref. The dynamometer control device 6 comprises: a response model 61 that receives a higher-order speed command signal Nr and outputs a model speed command signal Nr'; a feedforward controller 62 that receives the higher-order speed command signal Nr and outputs a feedforward input uff; and a speed controller 64 that generates the torque current command signal DYref on the basis of a feedback input ufb generated on the basis of a deviation e between the model speed command signal Nr' and the speed detection signal N, and the feedforward input uff.

4 Claims, 3 Drawing Sheets

(56) References Cited

U.S. PATENT DOCUMENTS

| | | | |
|---|---|---|---|
| 2015/0039246 A1* | 2/2015 | Takahashi | G01L 5/24 |
| | | | 702/41 |
| 2015/0101421 A1* | 4/2015 | Takahashi | G01L 5/0042 |
| | | | 73/862.325 |
| 2016/0109328 A1* | 4/2016 | Kanke | G01M 15/044 |
| | | | 73/865.6 |
| 2017/0350775 A1* | 12/2017 | Akiyama | G01M 15/04 |
| 2018/0348088 A1* | 12/2018 | Kanke | G01M 17/0074 |
| 2019/0178750 A1* | 6/2019 | Kanke | G01M 17/007 |
| 2020/0271539 A1* | 8/2020 | Akiyama | G01M 15/02 |
| 2021/0010903 A1* | 1/2021 | Akiyama | G01M 17/0072 |
| 2021/0011454 A1* | 1/2021 | Kanke | G01L 3/04 |
| 2021/0356360 A1* | 11/2021 | Akiyama | G01M 13/025 |
| 2022/0065750 A1* | 3/2022 | Akiyama | G01M 13/02 |
| 2022/0205869 A1* | 6/2022 | Akiyama | G01M 15/02 |
| 2022/0349779 A1* | 11/2022 | Akiyama | G05B 17/02 |
| 2022/0410924 A1* | 12/2022 | Takahashi | B60W 30/14 |

FOREIGN PATENT DOCUMENTS

| | | | |
|---|---|---|---|
| JP | 2012194117 A | | 10/2012 |
| JP | 6369596 B1 | | 8/2018 |
| JP | 201952862 A | | 4/2019 |
| JP | 201990624 A | | 6/2019 |

* cited by examiner

1

TEST SYSTEM HAVING A DYNAMOMETER AND A CORRESPONDING DYNAMOMETER CONTROL DEVICE

TECHNICAL FIELD

The present invention relates to a test system. In more detail, the present invention relates to a test system which connects a dynamometer to the output shaft of a test piece, and evaluates various performances of the test piece.

BACKGROUND ART

A test system called an engine bench system includes a dynamometer which is mechanically coupled with the output shaft of an engine that is the test piece; and a dynamometer control device which manipulates the dynamometer torque, and evaluates the various performances of the test piece (output characteristic, fuel economy characteristic, exhaust gas characteristic, etc.), by applying load to the test piece by the dynamometer under the control by the dynamometer control device.

Patent Document 1 shows a test system which generates a higher-order command signal corresponding to a command related to a control amount by a dynamometer control device, according to computation using a dynamic model of a vehicle to which an engine is equipped. According to such a test system, it is possible to evaluate the various performances of the engine in a state simulatively equipped to an actual vehicle with solely the engine without using the actual vehicle. With such a test system shown in Patent Document 1, the load torque on the engine end side is established as a higher-order command signal; however, it is also possible to establish, as the higher-order command signal, the revolution speed of the engine or the revolution speed of the dynamometer which is substantially equal thereto, depending on the simulative I/O configuration of actual vehicle.

Patent Document 1: Japanese Unexamined Patent Application, Publication No.2000-39381

DISCLOSURE OF THE INVENTION

Problems to be Solved by the Invention

In order to improve the reproducibility of tests in such a test system, it is necessary to improve the operational precision of the computer using the dynamic model, and also improve the control responsiveness of the dynamometer control device so as to follow the higher-order command signal generated by this dynamic model.

However, an antiresonance point at which the gain (dB) falls to negative exists in the transfer function from the higher-order command signal related to the dynamometer revolution speed until the dynamometer revolution speed, as explained referencing FIG. 3 later. In other words, the control amount does not change even if varying the operation mount at frequencies near the antiresonance point. The frequency of this antiresonance point varies depending on the moment of inertia of the test piece, spring constant of a fastening shaft, etc., but is on the order of tens of (Hz). For this reason, in the case of configuring the dynamometer control device by a simple feedback controller as is conventionally, since the response frequency to the higher-order command signal is restricted to on the order of at most ½ of the frequency of the antiresonance point, it is not possible to improve the control response to the higher-order command signal more than this.

It should be noted that, by providing a revolution detector to a test piece, it becomes a system in which the antiresonance frequency at the desired frequency band as the control response performance does not exist; however, a revolution detector may not be able to be attached due to restrictions of the test piece.

The present invention has an object of providing a test system which can raise the control response relative to a higher-order command signal irrespective of restrictions due to an antiresonance point existing in the control target.

Means for Solving the Problems

A test system (for example, the test system 1 described later) according to a first aspect of the present invention includes: a dynamometer (for example, the dynamometer 2 described later) coupled with an output shaft of a test piece (for example, the test piece W described later) by way of a fastening shaft (for example, the fastening shaft S described later); an inverter (for example, the inverter 5 described later) which supplies electric power according to a torque current command signal (DYref) to the dynamometer; a speed sensor (for example, the encoder 9 described later) which generates a speed detection signal (N) according to a revolution speed of the dynamometer; and a dynamometer control device (for example, the dynamometer control device 6 described later) which generates the torque current command signal based on the speed detection signal and a higher-order speed command signal (Nr) which is a command related to the revolution speed, and then inputs the torque current command signal to the inverter, in which the dynamometer control device includes: a response model (for example, the response model 61 described later) which outputs a model speed command signal (Nr') with the higher-order speed command signal as an input; a feedforward controller (for example, the feedforward controller 62 described later) which outputs a feedforward input (uff) with the higher-order speed command signal as an input; and a speed controller (for example, the speed controller 64 described later) which generates the torque current command signal, based on the feedforward input, and a feedback input (ufb) generated based on deviation (e) between the model speed command signal and the speed detection signal.

According to a second aspect of the present invention, in this case, it is preferable for the test system to further include: a shaft torque sensor (for example, the shaft torque sensor 8 described later) which generates a shaft torque detection signal (Tsh) according to shaft torque between the dynamometer and the test piece, in which the speed controller preferably includes: a feedback controller (for example, the feedback controller 65 described later) which generates the feedback input based on the deviation; and a resonance suppressing controller (for example, the resonance suppressing controller 67 described later) which generates the torque current command signal so as to suppress mechanical resonance between the test piece and the dynamometer, based on the speed detection signal, the shaft torque detection signal and a synthetic input (u), which is a sum of the feedback input and the feedforward input.

According to a third aspect of the present invention, in this case, it is preferable for a transfer function (Gff) from the higher-order speed command signal until the feedforward input of the feedforward controller to be equal to a product of a transfer function (Gm) from the higher-order speed command signal until the model speed command signal of the response model, and an inverse transfer function ($Gp^{-1}$) of a transfer function (Gp) from the synthetic input until the speed detection signal of a control target (for example, the control target P described later) including the dynamometer, the inverter and the resonance suppressing controller.

According to a fourth aspect of the present invention, in this case, it is preferable for a transfer function from the higher-order speed command signal until the feedforward input of the feedforward controller to be equal to a product of a transfer function from the higher-order speed command signal until the model speed command signal of the response model, and an inverse transfer function of a transfer function approximating a transfer function from the synthetic input until the speed detection signal of a control target including the dynamometer, the inverter and the resonance suppressing controller so as not to have a zero point of a positive real root.

Effects of the Invention (1) Since an antiresonance point such as that shown in FIG. 3 exists in the transfer function of the mechanical system including the dynamometer coupled with the test piece by way of a fastening shaft in the above way, it is not possible to raise the control response to the higher-order speed command signal past the restriction from the antiresonance point with only the feedback controller generating a feedback input based on the higher-order speed command signal and speed detection signal. In contrast, the dynamometer control device according to the present invention includes the response model which outputs the model speed command signal with the higher-order command signal as the input; the feedforward controller which outputs a feedforward input with the higher-order command signal as the input; and the speed controller which generates the torque current command signal based on the feedforward input from the feedforward controller and the feedback input generated based on the deviation between the model speed command signal and speed detection signal. In other words, with the present invention, since it is possible to design the response characteristic relative to the higher-order speed command signal of the dynamometer control device by way of the newly added response model and feedforward controller independently from the feedback controller, it is possible to raise the control response past the restriction from the antiresonance point, without harming the control stability.

(2) The speed controller according to the present invention includes: the feedback controller which generates the feedback input based on the deviation between the model speed command signal and the speed detection signal; and the resonance suppressing controller which generates the torque current command signal so as to suppress mechanical resonance between the test piece and the dynamometer, based on the speed detection signal, shaft torque detection signal and synthetic input, which is the sum of the feedback input and the feedforward input. The present invention can prevent excessive load from acting on the fastening shaft, by providing the resonance suppressing controller at a later stage than the feedback controller and feedforward controller.

(3) The present invention can raise the control response past the restriction from the antiresonance point, without harming the control stability and resonance suppressing function by the resonance suppressing controller, by making the transfer function from the higher-order speed command signal until the feedforward input of the feedforward controller equal to the product of the transfer function from the higher-order speed command signal until the model speed command signal of the response model, and the inverted transfer function of a transfer function from the synthetic input until the speed detection signal of the control target including the dynamometer, inverter and resonance suppressing controller.

(4) The present invention makes the transfer function from the higher-order speed command signal until the feedforward input of the feedforward controller equal to the product of the transfer function from the higher-order speed command signal until the model speed command signal of the response model, and the inverted transfer function of a transfer function approximating the transfer function from the synthetic input until the speed detection signal of the control target including the dynamometer, inverter and resonance suppressing controller so as not to have a zero point of the positive real root. Even if the above-mentioned transfer function of the control target is a non-minimum phase shift system, it is thereby possible to raise the control response past the restriction of the antiresonance point, without harming the control stability and resonance suppressing function by the resonance suppressing controller.

PREFERRED MODE FOR CARRYING OUT THE INVENTION

Figure 1:
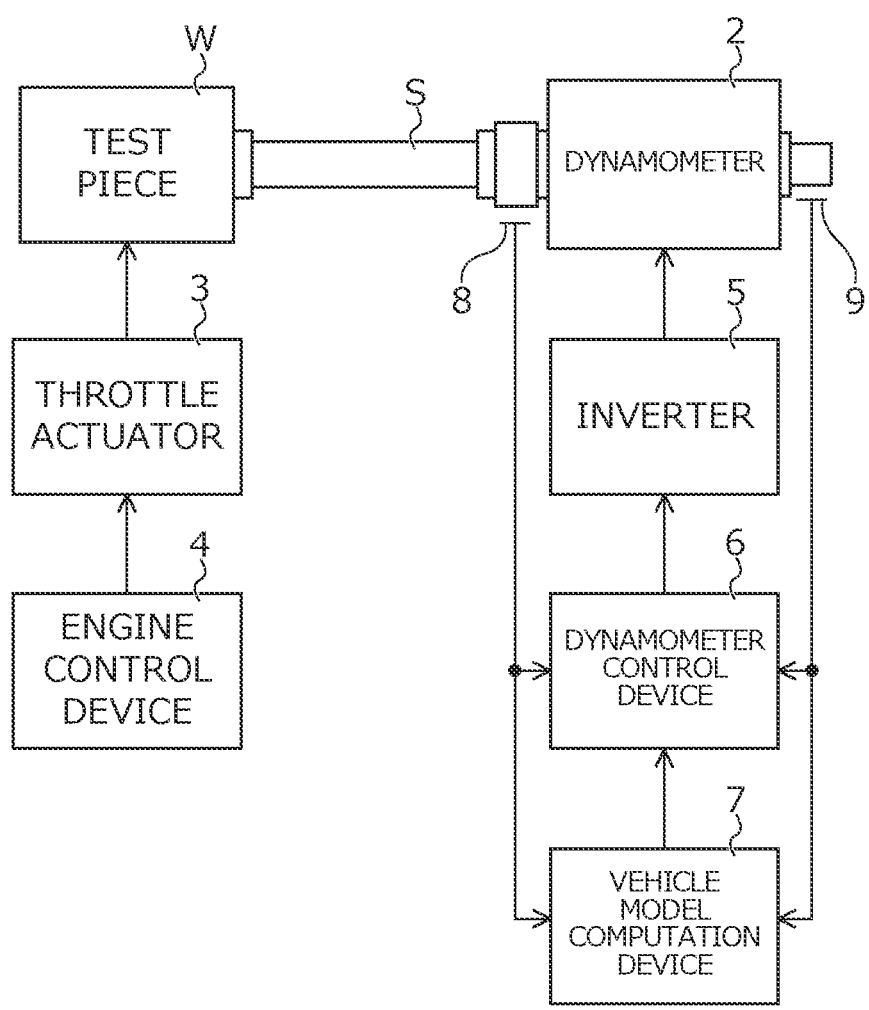
FIG. 1 is a view showing the configuration of a test piece according to an embodiment of the present invention.

Hereinafter, an embodiment of the present invention will be explained while referencing the drawings. FIG. 1 is a view showing the configuration of a test system 1 according to the present embodiment. The test system 1 is a so-called engine bench system which establishes an engine for a vehicle as a test piece W, and evaluates various performances of this test piece W. Although a case of establishing an engine as the test piece W will be explained hereinafter, the present invention is not limited thereto. The test piece W may be anything so long as including an output shaft which can connect to the dynamometer 2.

The test system 1 includes: a dynamometer 2 coupled to the output shaft of the test piece W by a fastening shaft S; a throttle actuator 3 and engine control device 4 controlling the test piece W; an inverter 5, dynamometer control device 6 and vehicle model computation device 7 which control the dynamometer 2; a shaft torque sensor 8 which generates a shaft torque detection signal according to the shaft torque of a fastening shaft S between the test piece W and dynamometer 2; and an encoder 9 which generates a speed detection signal according to the revolution speed of the dynamometer 2.

The throttle actuator 3 adjusts the intake air amount by operating the throttle valve provided in the intake path of the test piece, which is an engine, according to a command inputted from the engine control device 4. The engine control device 4 generates commands according to a mode determined for every test item, and inputs to the throttle actuator 3.

The inverter 5, when a torque current command signal generated according to a sequence explained later is inputted in the dynamometer control device 6, supplies electric power according to this torque current command signal to the dynamometer 2.

The dynamometer control device 6, based on the shaft torque detection signal of the shaft torque sensor 8, speed detection signal of the encoder 9, and higher-order speed command signal, which is a command relative to the revolution speed of the dynamometer 2, generates the torque current command signal so that the speed detection signal and higher-order speed command signal match, and then inputs this to the inverter 5. Load according to the higher-order speed command signal is thereby applied to the output shaft of the test piece W via the dynamometer 2. It should be noted that the circuit configuration of the dynamometer control device 6 will be explained while referencing FIG. 2 later.

The vehicle model computation part 7 generates the higher-order speed command signal by performing computation using the dynamic model of the vehicle equipped with the test piece W as the travel driving power generation source, based on the shaft torque detection signal of the shaft torque sensor 8 and speed detection signal of the encoder 9, and then inputs this to the dynamometer control device 6. By generating the higher-order speed command signal by performing computation using such a dynamic model of the vehicle with the test system 1, since it is possible to apply to the test piece W a load close to an actual vehicle during travel, it is possible to evaluate various performances of the test piece W in a state simulatively equipped to an actual vehicle by a simple test piece W without using an actual vehicle.

Figure 2:
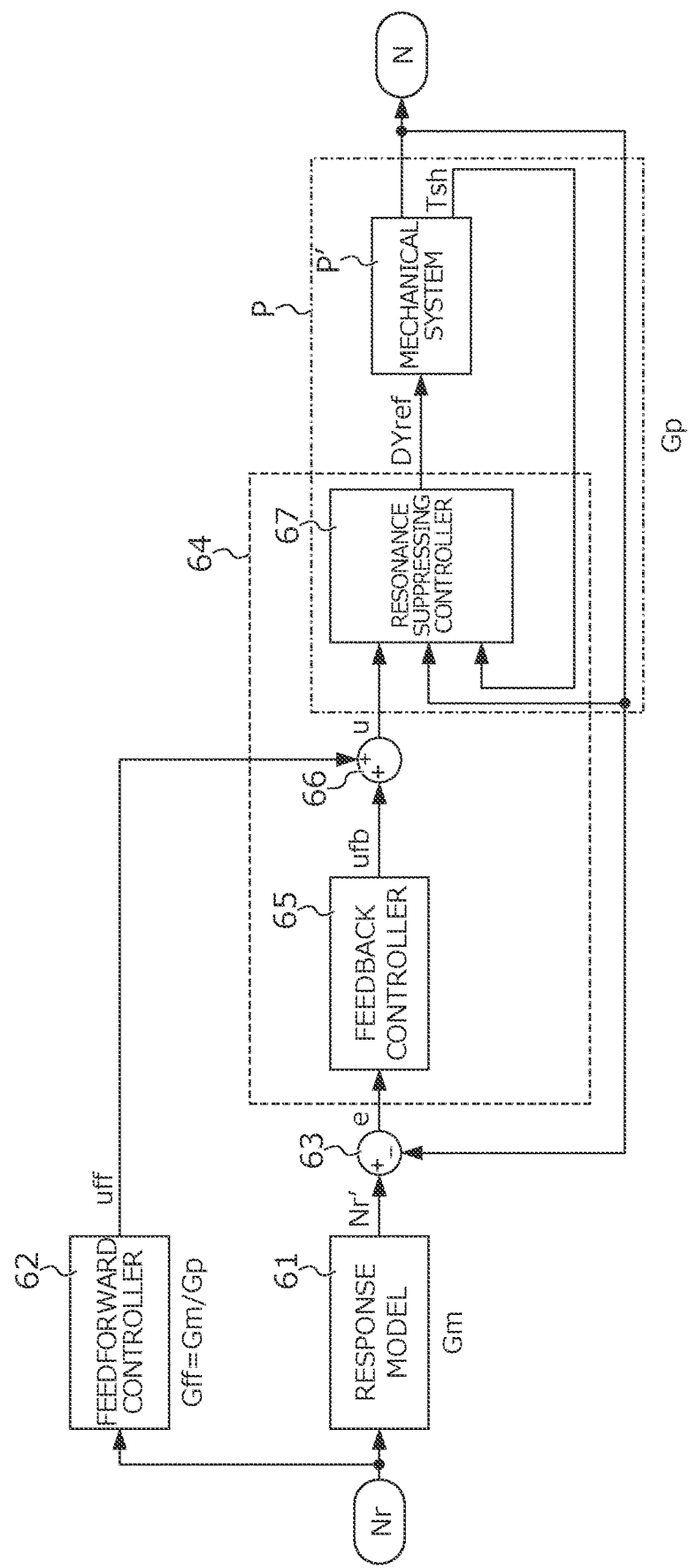
FIG. 2 is a view showing the configuration of a control circuit of a dynamometer control device.

FIG. 2 is a view showing the configuration of a control circuit of the dynamometer control device 6. The dynamometer control device 6 includes: a response model 61 that establishes the higher-order speed command signal Nr sent from the vehicle model computation unit 7 as the input and outputs a model speed command signal Nr'; a feedforward controller 62 which establishes the higher-order speed command signal Nr as the input and outputs a feedforward input uff; a subtractor 63 which outputs a speed deviation signal e by subtracting the speed detection signal N from the model speed command signal Nr'; and a speed controller 64 which generates a torque current command signal DYref based on the speed deviation signal e, feedforward input uff, speed detection signal N and shaft torque detection signal Tsh, and inputs this to the inverter 5.

The speed controller 64 includes: a feedback controller 65 which establishes the speed deviation signal e as the input, and outputs a feedback input ufb such that sets this speed deviation signal e to 0, in accordance with a known feedback control rule; an adder 66 which generates a synthetic input u by adding the feedforward input uff and feedback input ufb; and a resonance suppressing controller 67 which generates a torque current command signal DYref based on the synthetic input u, speed detection signal N and shaft torque detection signal Tsh.

The feedback controller 65 generates the feedback input ufb by integrating the speed deviation signal e. In the present embodiment, a case of establishing the feedback controller 65 as an integrator is explained; however, the present invention is not to be limited thereto.

The resonance suppressing controller 67 generates the torque current command signal DYref so as to suppress mechanical resonance which can occur in the fastening shaft S coupling the test piece W and dynamometer 2, based on the synthetic input u, speed detection signal N and shaft torque detection signal Tsh, and then inputs this to the inverter 5.

The transfer function Gm from the higher-order speed command signal Nr to the model speed command signal Nr' of the response model 61 and the transfer function Gff from the higher-order speed command signal Nr to the feedforward input uff of the feedforward controller 62 are designed as follows.

First, the transfer function Gff of the feedforward controller 62 is designed so as to equal the product of the transfer function Gm of the response model 61, and the inverse transfer function $Gp^{-1}$ of the transfer function Gp from the synthetic input u to the speed detection signal N of the control target P shown by the one-dot dashed line in FIG. 2 (Gff=Gm/Gp). Herein, the control target P used upon designing the transfer function Gff is defined to include not only the mechanical system P' including the dynamometer 2 coupled to the test piece W, the inverter 5 and encoder 9, but also the resonance suppressing controller 67, which is part of the speed controller 64.

It should be noted that, in the case of the transfer function Gp of the control target P being a non-minimum phase shift system in which a positive real root exists at the zero point, when defining the transfer function Gff using this inverse transfer function $Gp^{-1}$ as is, the feedforward controller 62 will becomes unstable. For this reason, in the case of the transfer function Gp being a non-minimum phase shift system, it is preferable to design the transfer function Gff of the feedforward controller 62 using the transfer function Gp_a obtained by approximating using a known method so as to have no zero point of the positive real root. In other words, in this case, the transfer function Gff of the feedforward controller 62 is preferably designed so as to equal the product of the transfer function Gm of the response model 61, and the inverse transfer function Gp_a-1 of the transfer function Gp_a approximating the transfer function Gp from the synthetic input u to the speed detection signal N of the control target P so as not to have a zero point of the positive real root.

By designing the transfer function Gff of the feedforward controller 62 in the above way, the target value response from the higher-order speed command signal Nr to the speed detection signal N of the dynamometer control device 6 comes to equal the transfer function Gm of the response model 61, in the case of there being no disturbance in the control target.

The order of the transfer function Gm of the response model 61 is set so that the transfer function Gff of the feedforward controller 62 becomes stable properly, i.e. so as to be at least the order of the transfer function Gp of the control target P or the denominator of an approximation Gp_a thereof. In addition, upon setting the order in the above way, the concrete function form of the transfer function Gm is designed so that the above-mentioned target value response equals the demanded frequency.

Figure 3:
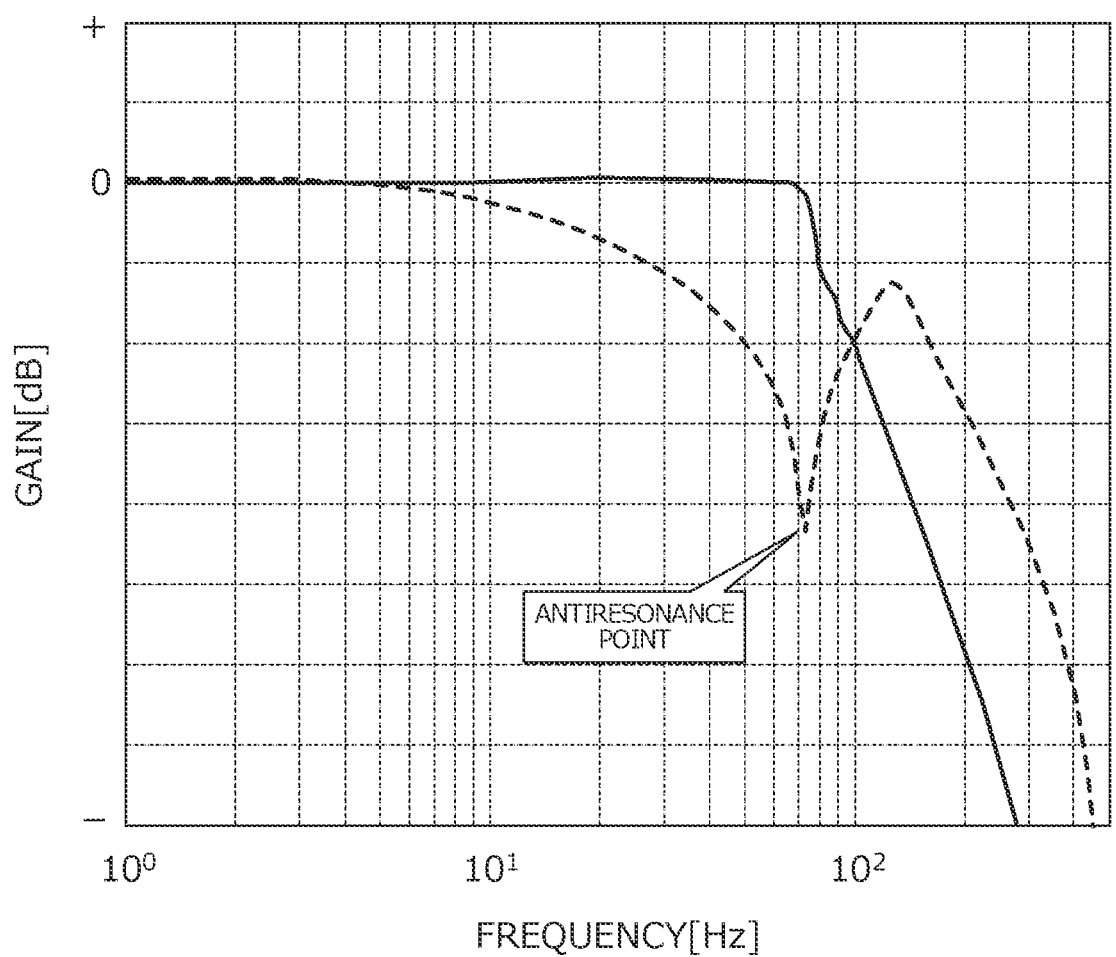
FIG. 3 is a Bode plot of a transfer function from a higher-order command signal until a speed detection signal.

FIG. 3 is a Bode plot of the transfer function from the higher-order speed command signal Nr to the speed detection signal N. In FIG. 3, the dashed line shows the results from a conventional dynamometer control device, and the solid line shows the results from the dynamometer control device 6 according to the present embodiment. Herein, conventional dynamometer control device refers to a device generating the torque current command signal from only a feedback controller.

As shown by the dashed line in FIG. 3, in the case of configuring the dynamometer control device by a simple feedback controller, an antiresonance point at which the gain (dB) falls to negative exists in the transfer function from the higher-order speed command signal Nr to the speed detection signal N exists. For this reason, with the conventional dynamometer control device, since the response frequency relative to the higher-order speed command signal is limited to on the order of at most ½ of the frequency of the antiresonance point, it is not possible to improve the control response to the higher-order speed command signal more than this.

In contrast, as shown by the solid line in FIG. 3, according to the dynamometer control device 6 related to the present embodiment, it is possible to suppress a fall in gain near the frequency of the antiresonance point by generating the torque current command signal DYref by the response model 61 and feedforward controller 62, in addition to the feedback controller 65. In other words, according to the dynamometer control device 6 related to the present embodiment, it is possible to improve the control response past the restriction by the antiresonance point.

According to the test system 1 related to the present embodiment, the following effects are exerted.

(1) The dynamometer control device 6 includes: the response model 61 which outputs the model speed command signal Nr' with the higher-order speed command signal Nr as the input; the feedforward controller 62 which outputs the feedforward input uff with the higher-order speed command signal Nr as the input; and the speed controller 64 which generates the torque current command signal DYref based on the feedforward input uff from the feedforward controller 62 and the feedback input ufb generated based on the deviation between the model speed command signal Nr' and the speed detection signal N. In other words, with the test system 1, since the response characteristic to the higher-order speed command signal Nr of the dynamometer control device 6 can be designed by the newly added response model 61 and feedforward controller 62 independently from the feedback controller 65, it is possible to raise the control response past the restriction by the antiresonance point, without hindering the control stability.

(2) The speed controller 64 includes the feedback controller 65 which generates the feedback input ufb based on the deviation between the model speed command signal Nr' and the speed detection signal N; and the resonance suppressing controller 67 which generates the torque current command signal DYref so as to suppress the mechanical resonance between the test piece W and the dynamometer 2, based on the speed detection signal N, shaft torque detection signal Tsh, and the synthetic input u which is a sum of the feedback input ufb and the feedforward input uff. With the test system 1, it is possible to prevent excessive load from acting on the fastening shaft S, by providing the resonance suppressing controller 67 at a later stage of the feedback controller 65 and feedforward controller 62.

(3) With the test system 1, by making the transfer function Gff from the higher-order speed command signal Nr until the feedforward input uff of the feedforward controller 62 equal to the product of the transfer function Gm from the higher-order speed command signal Nr until the model speed command signal Nr' of the response model 61 and the inverse transfer function $Gp^{-1}$ of the transfer function Gp from the synthetic input u until the speed detection signal N of the control target P including the dynamometer 2, inverter 5 and resonance suppressing controller 67, it is possible to raise the control response past the restriction by the anti-resonance point, without harming the control stability and the resonance suppressing function by the resonance suppressing controller 67.

(4) The test system 1 makes the transfer function Gff from the higher-order speed command signal Nr until the feedforward input uff of the feedforward controller 62 equal to the product of the transfer function Gm from the higher-order speed command signal Nr until the model speed command signal Nr' of the response model 61, and the inverse transfer function $Gp\_a^{-1}$ of the transfer function Gp_a approximating the transfer function Gp from the synthetic input u until the speed detection signal N of the control target P including the dynamometer 2, inverter 5 and resonance suppressing controller 67 so as not to have a zero point of the positive real root. Even if the above-mentioned transfer function Gp of the control target P is a non-minimum phase shift system, it is thereby possible to raise the control response past the restriction of the antiresonance point, without harming the control stability and resonance suppressing function by the resonance suppressing controller 67.

EXPLANATION OF REFERENCE NUMERALS 1 test system
W test piece
2 dynamometer
5 inverter
6 dynamometer control device
61 response model
62 feedforward controller
63 subtracter
64 speed controller
65 feedback controller
66 adder
67 resonance suppressing controller
7 vehicle model computation device
8 shaft torque sensor
9 encoder (speed sensor)

The invention claimed is:
1. A test system comprising:
a dynamometer coupled with an output shaft of a test piece by way of a fastening shaft;
an inverter which supplies electric power according to a torque current command signal to the dynamometer;
a speed sensor which generates a speed detection signal according to a revolution speed of the dynamometer; and
a dynamometer control device which generates the torque current command signal based on the speed detection signal and a higher-order speed command signal which is a command related to the revolution speed, and then inputs the torque current command signal to the inverter,
wherein the dynamometer control device includes:
a response model which outputs a model speed command signal with the higher-order speed command signal as an input;
a feedforward controller which outputs a feedforward input with the higher-order speed command signal as an input; and
a speed controller which generates the torque current command signal, based on the feedforward input, and a feedback input generated based on deviation between the model speed command signal and the speed detection signal, wherein a sum of the feedback input and the feedforward input is defined as a synthetic input, a first transfer function Gff from the higher-order speed command signal until the feedforward input of the feedback controller equals a product of a second transfer function Gm from the higher-order speed command signal until the model speed command signal of the response model, and an inverse transfer function of a third transfer function Gp from the synthetic input until the speed detection signal of a control target including the dynamometer, the inverter and the resonance suppressing controller or a fourth transfer function Gp_a approximating the third transfer function Gp.

2. The test system according to claim 1, further comprising: a shaft torque sensor which generates a shaft torque detection signal according to shaft torque between the dynamometer and the test piece, wherein the speed controller includes:

a feedback controller which generates the feedback input based on the deviation; and a resonance suppressing controller which generates the torque current command signal so as to suppress mechanical resonance between the test piece and the dynamometer, based on the speed detection signal, the shaft torque detection signal and the synthetic input.

3. The test system according to claim 2, wherein the first transfer function Gff equals a product of the second transfer function Gm, and an inverse transfer function of the third transfer function Gp, and the control target includes the resonance suppressing controller.

4. The test system according to claim 2, wherein the first transfer function Gff equals a product of the second transfer function Gm, and an inverse transfer function of the fourth transfer function Gp_a, the control target includes the resonance suppressing controller, and the fourth transfer function Gp_a is a transfer function that approximates the third transfer function Gp so as not to have a zero point of a positive real root.

* * * * *